Dec. 25, 1951　　　　E. C. LEACH ET AL　　　　2,580,306
SILO UNLOADER

Filed Sept. 5, 1945　　　　　　　　　　　　　7 Sheets-Sheet 1

INVENTORS
Elbert C. Leach.
Otto F. Manthie.
George D. Clapp.
By Cromwell, Greist & Warden
attys Dec. 25, 1951   E. C. LEACH ET AL   2,580,306
SILO UNLOADER
Filed Sept. 5, 1945   7 Sheets-Sheet 2
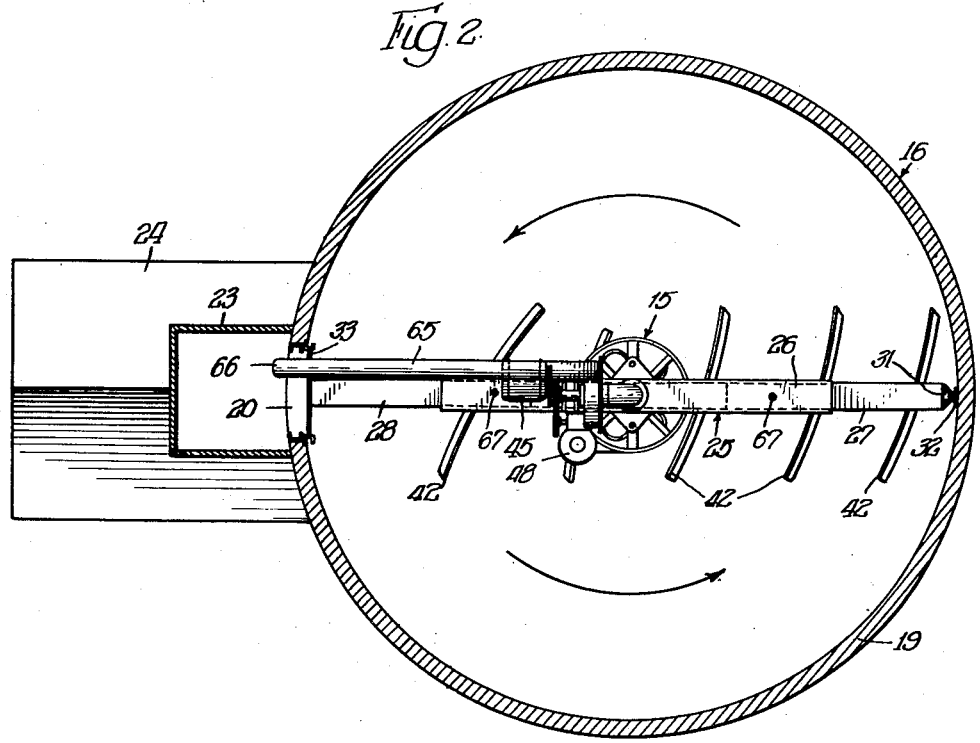
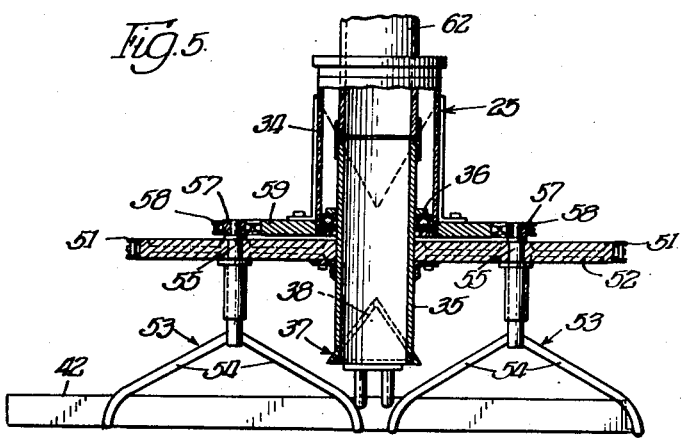
INVENTORS.
Elbert C. Leach,
Otto F. Manthie,
George D. Clapp,
By Cromwell, Greist & Warden
Attys.

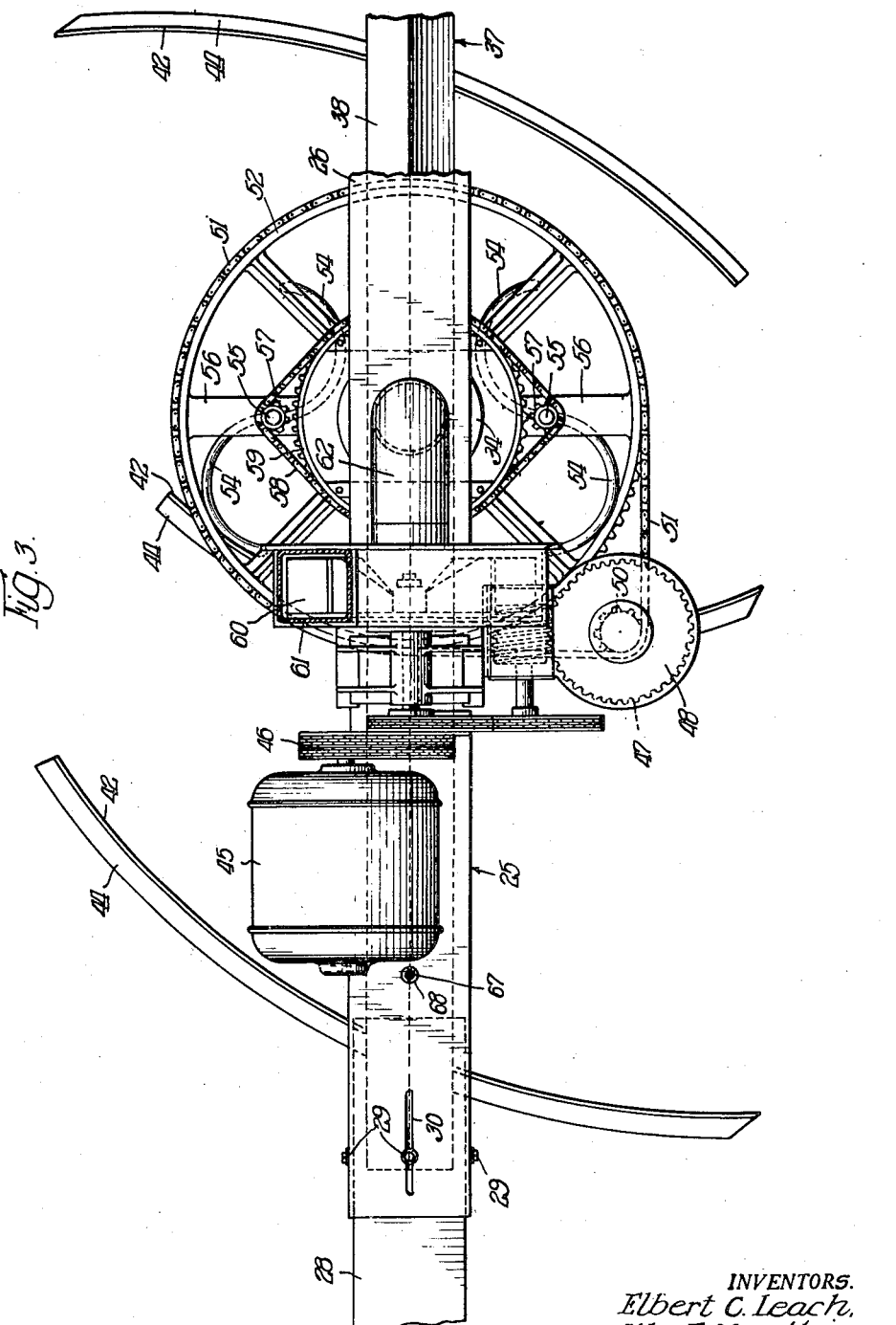

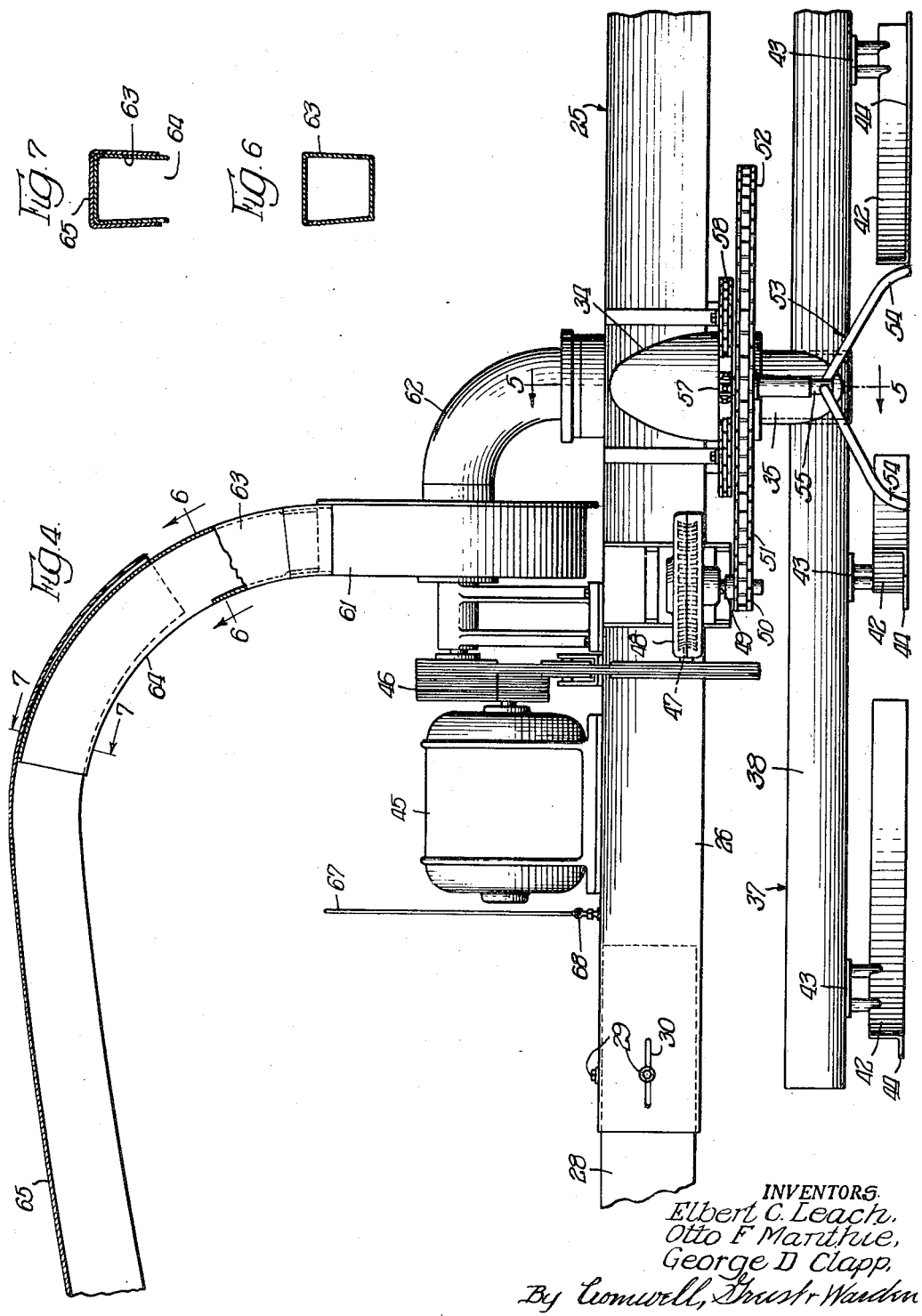

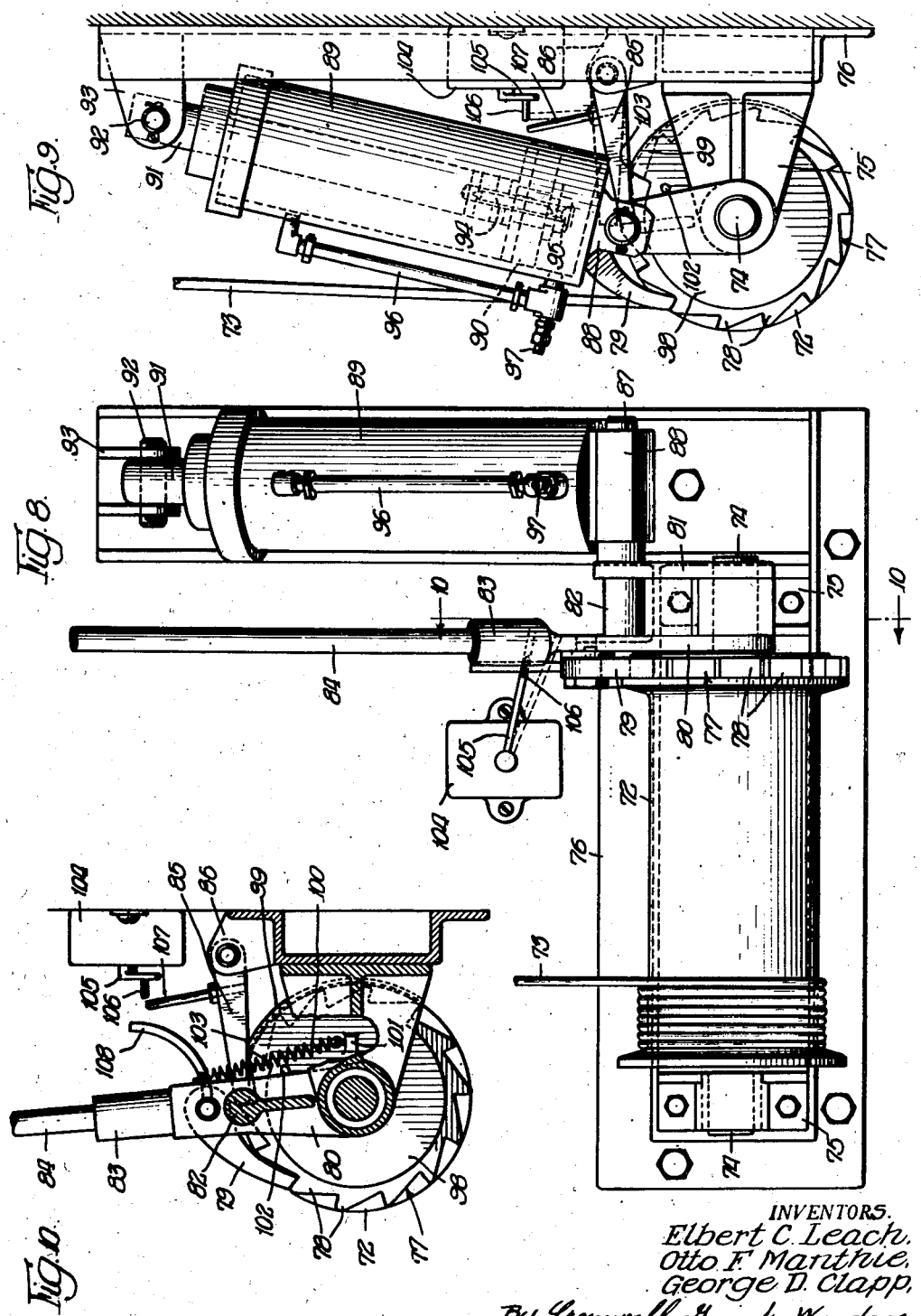

Dec. 25, 1951     E. C. LEACH ET AL     2,580,306
SILO UNLOADER
Filed Sept. 5, 1945     7 Sheets-Sheet 6
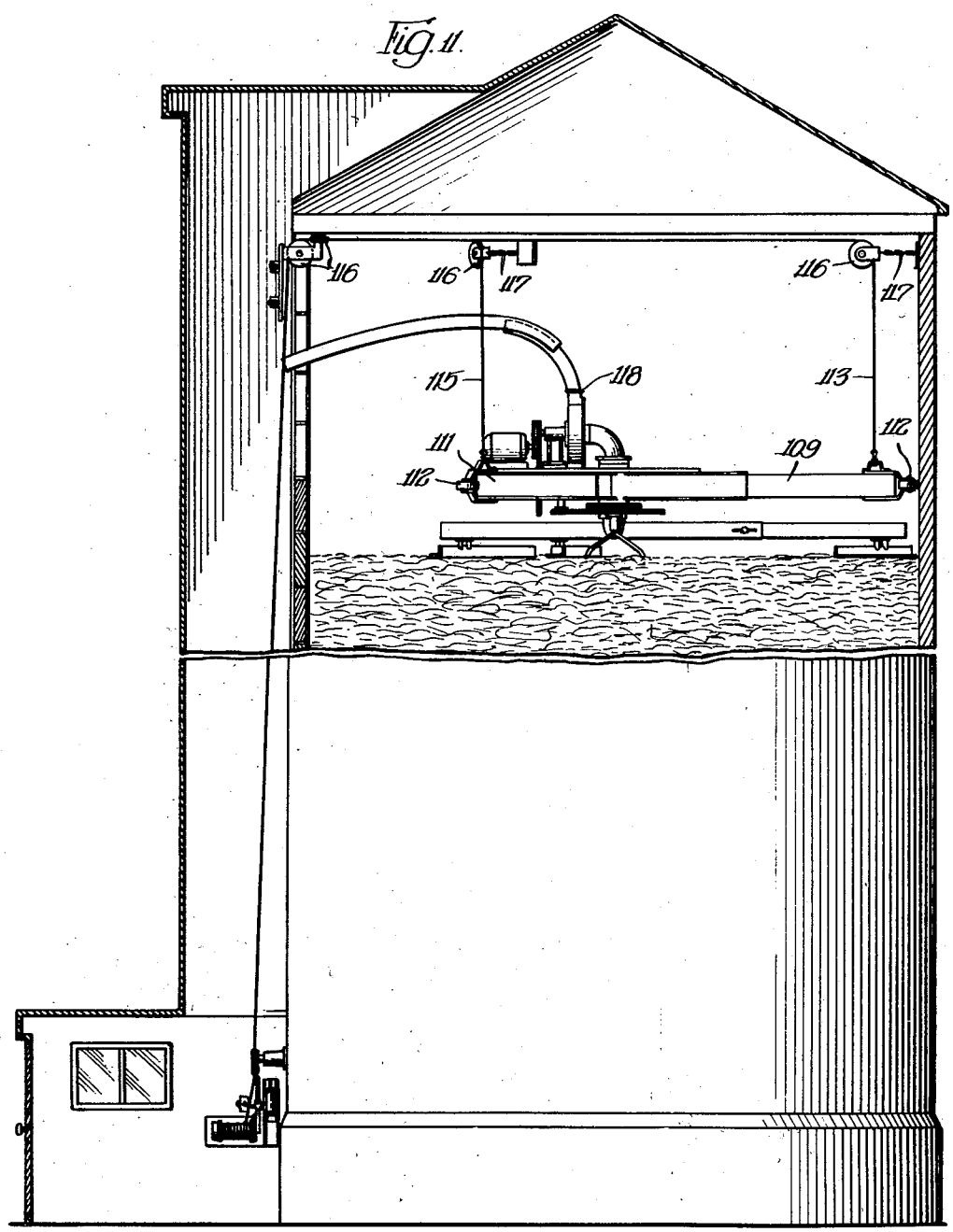
INVENTORS
Elbert C. Leach,
Otto F. Manthue,
George D. Clapp, Dec. 25, 1951     E. C. LEACH ET AL     2,580,306
SILO UNLOADER
Filed Sept. 5, 1945     7 Sheets-Sheet 7
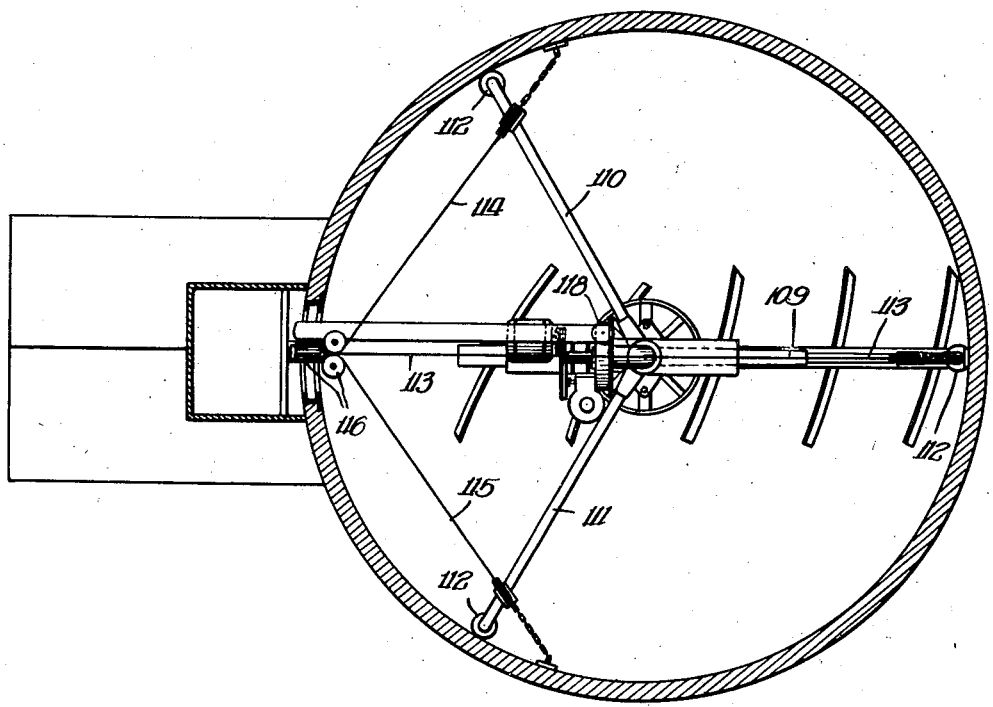
INVENTORS
Elbert C. Leach,
Otto F. Manthue,
George D. Clapp,
By Cromwell, Greist & Warden
attys.

Patented Dec. 25, 1951

2,580,306

UNITED STATES PATENT OFFICE 2,580,306

SILO UNLOADER

Elbert C. Leach, Otto F. Manthie, and George D. Clapp, Oshkosh, Wis., assignors to Leach Company, Oshkosh, Wis., a corporation of Wisconsin Application September 5, 1945, Serial No. 614,564

21 Claims. (Cl. 214—17)

This invention is concerned with a problem of long standing in connection with the operation of silos—namely, the removal of small quantities of silage at frequent intervals from the upper surface of the silage in the silo. From the very inception of silos this has been done by climbing up the outside of the silo to the level of the silage and there loosening and pitching down the desired quantity—a daily undertaking which is not only quite dangerous but very time consuming. Many attempts have been made over a period of years to devise mechanical unloading devices of various sorts which could be put to use for this purpose, but to our knowledge no one has heretofore been able to develop anything sufficiently practicable to supplant the old hand method of unloading. We believe, and the success of extended tests has demonstrated, that the silo unloader which forms the subject matter of the present invention is the answer to this problem.

The principal object of the invention is to provide a silo unloader of novel construction and operation with which any desired quantity of silage can be easily, quickly and automatically removed from a silo, with complete safety to the operator.

The new unloader is inexpensive to construct; can be applied to existing types of silos at but small expense; requires but little attention; and is operable under the most severe weather conditions. It will not only remove a predetermined quantity of silage but will do so in such manner as to clear off all of the loosened silage upon completion of the removing operation and leave an even surface which will effectively seal off the underlying silage, thereby in large measure eliminating the top spoilage which all too frequently occurs where the surface of the silage is unevenly cut into by reason of the use of a pitchfork, axe, or other hand operated implement.

While the foregoing statements are indicative in a general way of the nature of the invention other more specific objects and advantages will be apparent to those skilled in the art upon a full understanding of the construction, arrangement and manner of operation of the new unloader.

Two different embodiments of the invention are presented herein by way of exemplification, but it will of course be appreciated that the invention is susceptible of incorporation in various other structurally modified forms coming equally within the scope of the appended claims.

In the accompanying drawings:

Fig. 2 is a horizontal section through the upper portion of the silo, showing the unloader in operative position;

Fig. 3 is a fragmentary plan view of the center portion only of the unloader;

Fig. 4 is a fragmentary side view of such center portion;

Fig. 5 is a vertical section through the suction pickup duct, taken on the line 5—5 of Fig. 4;

Fig. 6 is a transverse section through the discharge conduit, taken on the line 6—6 of Fig. 4;

Fig. 7 is another transverse section through the discharge conduit, taken on the line 7—7 of Fig. 4;

Fig. 8 is a side view of the manually adjustable device used in automatically controlling the operation of the unloader;

Fig. 9 is an end view of the control device;

Fig. 10 is a vertical section through the control device, taken on the line 10—10 of Fig. 8;

Fig. 11 is a partially sectioned side view of a silo equipped with a modified form of the unloader; and Fig. 12 is a horizontal section through the upper portion of the silo illustrated in Fig. 12, showing the unloader in operative position.

Figure 1:
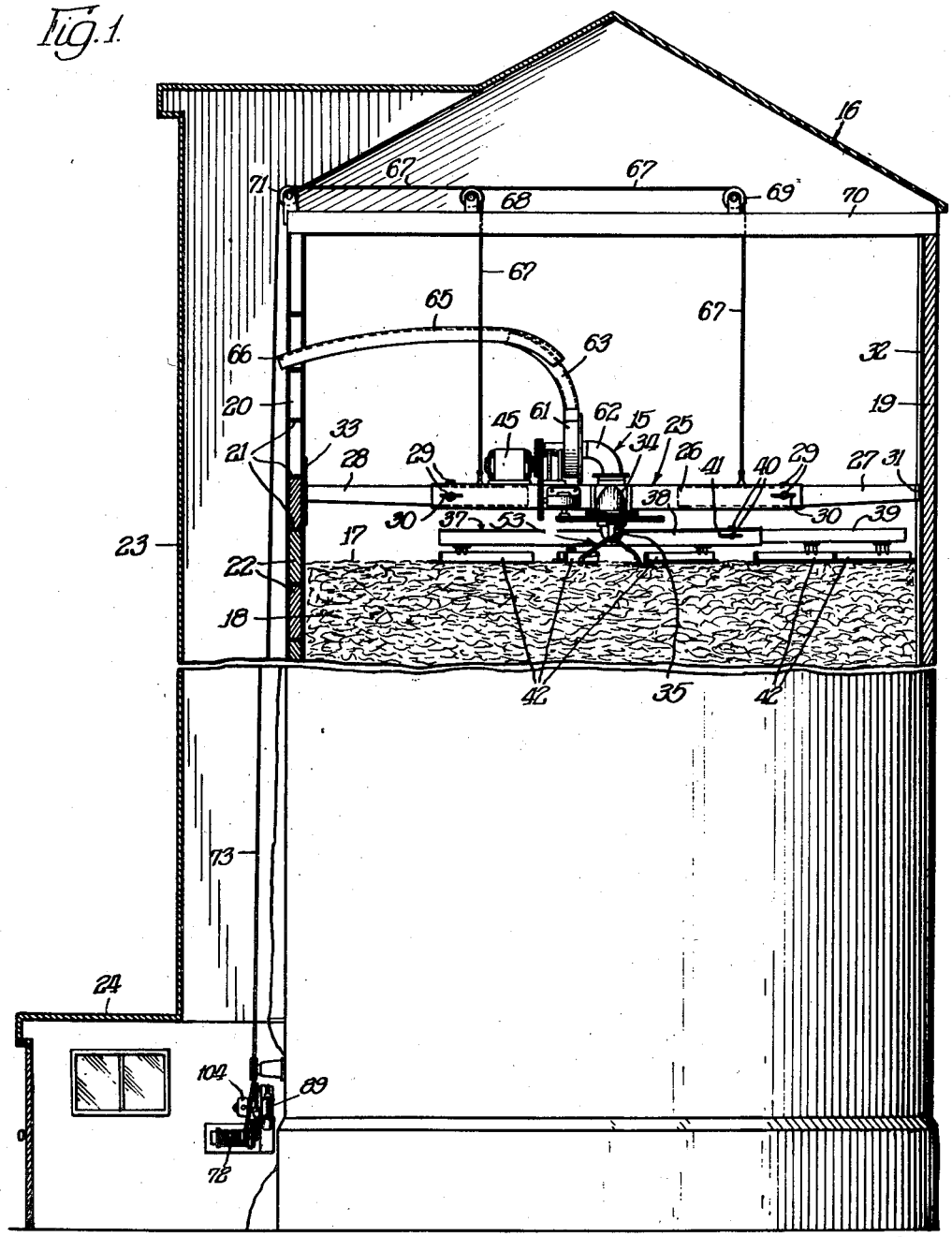
Fig. 1 is a partially sectioned side view of a silo equipped with an unloader constructed in accordance with the invention.

The unloader illustrated in Figs. 1 to 10, inclusive, will first be described. As will be observed in these views, the unloader 15 is positioned in a silo 16 above the upper surface 17 of the silage 18. The silo 16 is approximately circular in form and is provided at one point in the circumference of its side wall 19 with a narrow discharge opening 20. The opening 20 extends vertically for practically the full height of the silo to facilitate unloading at any elevation and is cross braced at regular intervals by horizontally extending bars 21 between which readily removable panels 22 are positioned for retaining the silage at the location of the opening. The opening 20 is closed on the outside of the silo by a chute-like shelter 23 which opens at its lower end into an enlarged entry way 24 into which the silage discharged at various elevations from the opening 20 is collected. Except for the unloader 15, these silo features are more or less conventional and form no part of the present invention.

The unloader 15 includes a horizontally elongated beam-like frame 25 of generally triangular cross section. The frame 25 extends across the inside of the silo from one side of the same to the other above the upper surface 17 of the silage, and is guidingly supported for vertical movement within the silo whereby to follow the upper surface 17 of the silage downwardly as the latter is removed. The frame 25 of the unloader is extensible to conform to the width of the silo and comprises a main load carrying center section 26 and two end sections 27 and 28. The end sections 27 and 28 are telescopically associated with the center section 26 and are adjustably secured to the same by means of bolts 29 which engage within elongated slots 30. The end section 27 is provided at its extremity with an anti-friction shoe 31 which is adapted to interlock horizontally with and slide vertically on a vertically disposed guide rail 32. The rail 32 is secured to the side wall 19 of the silo at a point opposite the opening 20, in but slightly projecting relation to the inner surface of the side wall. The end section 28 is similarly provided at its extremity with a relatively wide anti-friction shoe 33 which fits against the spaced side edges of the vertical opening 20 in horizontally interlocked but vertically slidable association with the same. The shoes 31 and 33 act to prevent the frame 25 from turning within the silo while allowing the frame to move freely up and down.

The main load-carrying section 26 of the frame is provided at the center of the silo with an enlarged housing portion 34 in which a vertically disposed cylinder 35 is journaled in bearings 36. The cylinder 35—which constitutes a suction pickup duct—is open at both ends and projects a substantial distance below the frame 25 to a point immediately above the upper surface 17 of the silage.

The pick-up duct 35 rotates relative to the frame 25 and carries a cutter 37 which rotates as a unit with the duct. The cutter 37 includes a horizontally disposed beam 38 of generally triangular cross section which is rigidly secured to the duct 35, and an extensible section 39 of similar cross section which is telescopically associated with one end of the beam 38. The extensible section 39 is held in any desired position of radial adjustment relative to the side wall 19 of the silo by bolts 40 which engage within elongated slots 41. A plurality of cutting blades 42 are rigidly secured, some to the beam 38 and others to the extension 39, by downwardly extending brackets 43. The blades 42 are preferably curved somewhat in the direction of their length and are disposed in a common horizontal plane at angles to the axis of the beam, with the blades on one side of the center of rotation facing in a direction opposite to that of the other blades and spaced from the center of rotation at distances intermediate those of the other blades, whereby to traverse all of the upper surface 17 of the silage during each revolution of the cutter. The blades 42 are preferably of generally L-shaped cross section, with their horizontal flanges 44 disposed substantially flush with the lower edges of the blades at the back of the latter whereby to support to a limited extent the weight of the unloader on the upper surface 17 of the silage and prevent undue knifing of the blades down into the silage. The flanges 44, if desired, may be omitted, leaving only the vertically disposed portions of the blades.

When the unloader is at rest the flanges 44 of the blades 42 will be disposed substantially flush with the upper surface 17 of the silage. When the cutter assembly is placed in operation the unloader commences to move downwardly and the weight of the same is in part supported by the lower edges of the blades on the surface of the silage. As the cutter assembly rotates the blades 42 cut into and loosen the uppermost silage by a combined knifing and scraping action and work the loosened silage progressively in toward the center 17, cutting gradually downward as the top silage is loosened and gathered while at all times maintaining beneath the cutter assembly a more or less smooth and uniform horizontal surface of uncut silage.

The cutter 37 is rotated very slowly—preferably at about 2 R. P. M.—by means of an electric motor 45 which is mounted on the load-carrying section 26 of the frame 25 at one side of the center of the same. The motor 45 is connected by suitable belting 46 with reduction gearing 47 located in a casing 48 attached to the frame, and the gearing 47 is provided with a downwardly extending output shaft 49 which terminates at its lower end in a small pinion 50. The pinion 50 engages a chain 51 which is trained about a large gear 52 (Fig. 5). The gear 52 rotates the cutter 37 and is rigidly attached at its center to the rotating pick-up duct 35 at a point between the frame 25 and the beam 38.

In addition to the blades 42 the cutter 37 is provided adjacent the pick-up duct 35 with two oppositely disposed agitators 53 which rotate at a rather high rate of speed. The agitators 53 consist of downwardly diverging fingers 54 which are secured at their upper ends to short vertically disposed shafts 55. The shafts 55 are journaled in spokes 56 of the gear 52 and are surmounted by small pinions 57. The pinions 57 are engaged by a chain 58 which is trained about a stationary gear 59. The gear 59 is stationary and is rigidly secured above the rotatable gear 52 to the enlarged portion 24 of the center section 26 of the frame. Rotation of the gear 52 with its associated cutter assembly results in relatively rapid rotation of the agitating fingers 54. The fingers 54 terminate approximately even with the lower edge of the blades 42 and extend inwardly under the entrance to the pick-up duct 35, whereby to raise the loosened silage received from the blades 42 and assist in moving the same into the suction area immediately beneath the pick-up duct 35.

The duct 35 operates by suction to pick-up the loosened silage beneath the lower end of the same. The necessary suction is provided by a fan 60 which is mounted in a circular casing 61 on the frame 25. The duct 35 is connected with the centrally arranged inlet of the casing 61 by an upwardly and laterally extending conduit 62 which is secured to the frame 25 in register with the upper end of the duct. The fan 60 is rotated at a high rate of speed from the motor 45 by a portion of the previously mentioned belting 46. From the outlet of the casing 61 the silage is carried in a rapidly moving current of air through a second upwardly and laterally extending conduit 63, which conduit is open along the underside of its curved portion at 64 whereby to prevent any of the air-borne silage from being deposited on and sticking to the same. Beyond the end of the conduit 64 the silage is blown through and deflected gradually downward by an outwardly extending trough 65 of inverted U-shaped cross section, which trough is slidably nested over the upper end of the conduit 63 and is curved in conformity with the same. The discharge end 66 of the trough 65 rests loosely on one of the cross bars 21 in the opening 20 in the side wall of the silo and serves to direct the silage into the chute-like closure 23 leading down the outside of the silo. Because of the loosely jointed connection between the conduit 63 and the trough 65 the position of the discharge end 66 of the trough between the cross bars 21 need be changed only at infrequent intervals.

The unloader gradually descends in the silo as the silage is progressively removed from the upper surface 17. After the silo has been emptied and before it is refilled the unloader is hoisted to the top of the silo by cables 67. The cables 67 also regulate the downward movement of the unloader. The cables 67 are attached to the load-carrying section 26 of the frame 25 at opposite sides of the center of the same by means of eye bolts 68, and extend upwardly to pulleys 69 mounted on cross timbers 70. From the pulleys 69 the cables 67 extend laterally to other pulleys 71 and then downwardly along the outside of the silo to a hoisting drum 72, which drum is located in a sheltered position within the entry way 24. Before reaching the drum 72 the cables 67 are splined or otherwise secured together to provide a single control cable 73 for engagement with the drum. The free end of the cable 73 is fixedly secured in any suitable manner to the drum.

When the unloader is placed in operation the cable 73 on the drum 72 is payed out very slowly for a distance equal to the desired depth of cut. After the silage has been removed to that depth the drum is stopped and the cable prevents further downward movement of the unloader. While the cable is being payed out the weight of the unloader acts through the revolving blades 42 of the cutter to plow the upper surface 17 of the silage to the desired depth. The blades simultaneously gather the loosened silage in toward the center beneath the duct 35, where the same is immediately picked up by the suction in the duct and carried upwardly and laterally to the point of discharge.

The means provided for automatically controlling both the downward movement and the rotary action of the cutter 37 will now be described.

The drum 72 is flanged at its ends to retain the cable 73 and is provided with trunnions 74 which are journaled in bearing brackets 75 attached to a stationary mounting panel 76. A circular ratchet 77 is fixedly secured to one end of the drum 72 concentrically of the latter and is provided with teeth 78 which are adapted to be engaged by a lifting pawl 79. The pawl 79 is pivotally attached to the upper portion of one of two spaced parallel links 80 and 81. The links 80 and 81 are journaled at their lower ends on the adjacent trunnions 74 of the drum at opposite sides of the bracket 75 in which that trunnion is journaled and are rigidly connected together near their upper ends by a webbed stud formation 82. The link 80, in addition to forming a mounting for the pawl 79, is provided with an upwardly opening socket 83 in which a hand lever 84 is positioned. A second pawl 85, which serves as a locking pawl, is pivotally mounted on a stationary bracket 86 for coaction with the teeth 78 of the ratchet 77 at a point behind the lifting pawl 79. The stud 82 which connects the links 80 and 81 projects from the link 81 and is provided with a reduced portion 87 which is rotatably mounted in an aperture formed in a lug 88 on the lower end of an oil filled cylinder 89.

The cylinder 89 is closed at both ends and contains an axially movable piston 90. The piston 90 is attached to the lower end of a rod 91 which extends upwardly through an aperture in the upper end of the cylinder and is pivotally connected by means of a pin 92 with a stationary bracket 93. The piston 90 contains a one-way escape port 94 which is controlled by a valve 95. The valve 95 opens when the lower end of the cylinder 89 is moved downwardly and outwardly, by manipulation of the hand lever 84, but closes automatically when the lower end of the cylinder attempts to move in the opposite direction under the pull of the cable 73 on the drum 72, acting through the pawl 79 and the ratchet 77. A pipe 96 is mounted on the outside of the cylinder 89 and forms a small by-pass for the oil from the lower to the upper end of the cylinder about the piston 90. This pipe contains a valve 97 for controlling the rate of flow of the oil through the same. By adjusting the valve 97 the speed at which the lower end of the cylinder 89 is permitted to move upwardly and inwardly, and consequently the rate at which the drum 72 is permitted to pay out the cable 73, can be easily and accurately regulated.

The ratchet 77 is provided with a shield 98 for the teeth 78. This shield is rotatably mounted on the adjacent trunnion 74 of the drum and has a short arcuate portion 99 which is adapted to move into a shielding position between the locking pawl 85 and the teeth 78 when the shield is turned through a small angle. The shield 98 is rotated in one direction by a tensioned coil spring 100 which is connected at its upper end to one edge of the link 80 and at its lower end to a small lug 101 on one side of the shield. The shield is rotated in the opposite direction by abutment of the link 80 with a small projecting stud 102 on the shield.

As long as the drum 72 is held against unwinding by engagement of the locking pawl 85 with one of the teeth 78 on the ratchet, the clamping pressure on the end of the pawl 85 will hold the same down and prevent the arcuate portion 99 of the shield from riding forwardly to cam the pawl away from the ratchet, but as soon as that pressure is relieved by a greater pressure being exerted on one of the teeth 78 by the lifting pawl 79 the arcuate portion 99 of the shield will move forwardly under the action of the spring 100 and will cam the locking pawl 85 upwardly at 103 into an elevated position, where it will be held by the arcuate portion 99 from moving back into engagement with the teeth until the arcuate portion is subsequently moved out from under the locking pawl 85 by the movement of the link 80 in that direction with the link 80 in engagement with the stud 102.

The motor 45 which rotates the cutter 37 and operates the suction fan 60 is controlled by a switch 104 which is mounted in proximity to the drum 72. The switch 104 may be an ordinary manually closed and manually opened switch but is preferably a device which upon being manually closed will automatically open after a predetermined length of time. Time switches of this type, operated by clock-work mechanism or other means, are well known in the electrical switch art and therefore will not be described here. The switch 104 is provided with a small setting lever 105, which lever is equipped near its outer end with a laterally extending blade 106. The blade is located just above the locking pawl 85 and is adapted to be held in an elevated position by a timing screw 107 which is adjustably mounted in the pawl 85 and projects upwardly therefrom.

To start the cutter 37 rotating and the fan 60 operating, the lever 105 of the switch is raised by hand into its most elevated position. This closes the circuit of the motor 45. From that position the lever 105 will work slowly downward with the circuit closed under the control of the clock-work or other mechanism restraining the same until it reaches its lowermost position, at which point the circuit of the motor 45 will be opened and the latter will be brought to rest. The movement of the lever 105 from its uppermost circuit closing position to its lowermost circuit opening position is so regulated as to take a predetermined length of time, say fifteen minutes, for its travel. By stopping the lever 105 when it is but part way down, say two-thirds of the way down, the motor 45 will continue to operate for a portion of the total time period, which in this case would be five minutes, after the lever has been released and permitted to finish its downward movement. the timing screw 107 acts to stop the lever 105 in its downward movement when the locking pawl 85 is elevated into its inoperative position, and by adjusting the height of the screw 107 above the pawl the motor 45 can be caused to operate any desired number of minutes after the pawl 85 with the screw 107 on it has dropped down into locking engagement with one of the teeth 78 to stop further unwinding of the drum 72.

When the unloader is not in use the motor 45 will be shut off, and the control mechanism will be in the position shown in Figs. 8, 9 and 10, with the locking pawl 85 engaging one of the teeth 78 of the ratchet to hold the drum 72 from unwinding the cable 73 supporting the unloader. To place the unloader in operation, the lever 105 of the switch is first raised by hand into its uppermost position, whereby to start the motor 45 and get both the cutter 37 rotating and the fan 60 operating at full speed before any downward movement of the cutter 37 commences. After the motor 45 has been permitted to run for a short period of time, the lifting pawl 79 is lifted from its engagement with one of the teeth 78 of the ratchet by manipulating a small handle 108 provided on the rear end of the pawl for that purpose, and the hand lever 84 is swung forwardly and downwardly in an arc of any desired extent. At the end of the movement of the hand lever 85 the pawl 79 is again permitted to slip into engagement with one of the teeth 78. The arcuate distance which the hand lever 84 is moved in this manner represents the depth of cut which will take place in the upper surface 17 of the silage, and this depth can be regulated by varying at will the amount of arcuate movement imparted to the hand lever. During the forward and downward movement of the hand lever the lower end of the cylinder 89 will move with the same, such movement being permitted by the one-way valve 95 in the piston 90, which valve permits a certain quantity of the oil confined in the upper portion of the cylinder to be transferred to the lower portion.

By now applying downward pressure on the hand lever 84 with the lifting pawl 79 in engagement with one of the teeth 78 of the ratchet, the torque previously exerted on the drum 72 by the cable 73 will be momentarily relieved from the locking pawl 85, and as soon as this pressure is relieved the spring 100 will act through the arcuate portion 99 of the shield 98 to cam the locking pawl 85 out of engagement with the underlying tooth 78 on the ratchet. The tension exerted by the cable 73 will then be transmitted directly to the lifting pawl 79 and the latter, together with the links 80 and 81 and the lower end of the cylinder 89, will yield upwardly and rearwardly in an arc at a very slow rate of speed, which rate will be controlled by the passage of the oil through the pipe 96 and can be adjusted as desired by regulation of the valve 97 in the pipe.

As the unloader moves downwardly in the silo during the unloading operation, the shield 98 will be turned slowly back by reason of the engagement of the edge of the link 80 with the stud 102, and when the desired depth of cut is reached the front edge of the arcuate portion 99 of the shield will have reached a position wherein it will permit the locking pawl 85 to drop downwardly into the path of the next tooth 78 on the ratchet. The pawl 85 will then act as a stop to prevent further rotation of the drum 72, thereby arresting the downward movement of the cutter 37. At the same time, the upper end of the timing screw 107 on the pawl 85 will move downwardly out from under the blade 106 on the lever 105 of the switch and will allow such lever to continue its previously interrupted downward movement for a predetermined period, say an additional five minutes, before the switch opens and the rotation of the cutter 37 is stopped. This additional operating period for the cutter 37, after its downward movement has been stopped, affords time for all of the previously loosened silage to be moved in toward the center of the silo by the blades 42, picked up in the duct 35 with the assistance of the agitators 53, and discharged laterally from the end 66 of the trough.

When an ordinary electric switch is used for controlling the motor 45 the operator will merely let the motor run for a time after the cable 73 has been fully paid out—say, for five minutes—and will then shut off the switch by hand.

Where the upper surface 17 of the silage is in a soft condition, as is usually the case during the warmer months, the blades 42 of the cutter 37 will be prevented from sinking in and embedding themselves too far during their cutting movement by the restraining action of the slowly paid out cable 73. When the upper surface 17 is hardened by freezing or other causes, the resulting reduction in the speed of the downward movement of the cutter 37 will permit the full weight of the unloader to act through the blades 42 on the hardened surface, with equally good cutting results.

In the modified embodiment shown in Figs. 11 and 12, the unloader, instead of being guided in its up and down movement on vertically disposed rails at the opposite sides of the silo, is centered in the silo by a spider-like frame. This frame includes three radially disposed arms 109, 110 and 111. These arms are provided at their outer ends with anti-friction rollers 112 for engagement with the inside of the silo. The three arms 109, 110 and 111 are connected respectively with cables 113, 114 and 115 which extend directly upward from the arms and are trained over pulleys 116 secured by chains 117 to the upper edge of the silo. As in the first described embodiment, the three cables may be connected together before reaching the hoisting drum. This three point suspension permits the entire unloader to turn to a certain extent in the silo upon the cutter encountering hard going, which turning movement will raise the unloader somewhat by reason of the resulting angular disposition of the cables and will consequently relieve the load on the motor. The weight of the unloader will thereafter bring the same back into its normal position as soon as the resistance to continued downward cutting has eased. The discharge duct may be swiveled at 118 to permit the unloader to turn backwardly in accommodating itself to the resistance met with by the cutter.

We claim:

1. A silo unloader, for installation in a silo above the upper surface of the silage, comprising a vertically movable frame, means carried by the frame for loosening the silage and discharging it laterally from the silo as the frame moves downwardly, a motor for operating said means, means for automatically stopping the downward movement of the frame after the same has moved a predetermined distance, and means for automatically shutting off the motor a predetermined length of time after the downward movement of the frame has been stopped.

2. A silo unloader, for installation in a silo above the surface of the silage, comprising a vertically movable frame, means for suspending and lowering the frame in the silo, a cutter journaled in the frame at the center of the silo for rotation relative to the frame in a substantially horizontal plane, blades on the cutter for loosening the silage at the upper surface of the latter and working the loosened silage in toward the center of the silo, an air duct having an unobstructed vertical inlet portion mounted on the frame at the center of the same and leading upwardly from the cutter adjacent the center of the silo, and means mounted on the frame and associated with the duct intermediate the inlet and discharge ends of the same for creating an upward flow of air therein of sufficient intensity to cause the loosened silage to be sucked up into the duct for discharge laterally from the silo.

3. A silo unloader, for installation in a silo above the surface of the silage, comprising a vertically movable frame, means for suspending and lowering the frame in the silo, a cutter journaled in the frame at the center of the silo for rotation relative to the frame in a substantially horizontal plane, blades on the cutter for loosening the silage at the upper surface of the latter and working the loosened silage in toward the center of the silo, an air duct having unobstructed vertical inlet portion leading upwardly from the cutter adjacent the center of the silo, means associated with the duct intermediate the inlet and discharge ends of the same for creating an upward flow of air therein of sufficient intensity to cause the loosened silage to be sucked up into the duct for discharge laterally from the silo, and control means associated with said lowering means for automatically stopping the downward movement of the frame after the latter has descended within the silo a predetermnied distance with the cutter rotating.

4. A silo unloader, for installation in a silo above the surface of the silage, comprising a vertically movable frame, means for suspending and lowering the frame in the silo, a cutter journaled in the frame at the center of the silo for rotation relative to the frame in a substantially horizontal plane, blades on the cutter for loosening the silage at the upper surface of the latter and working the loosened silage in toward the center of the silo, an air duct leading upwardly from the cutter adjacent the center of the silo, means associated with the duct for creating an upward flow of air therein of sufficient intensity to cause the loosened silage to be sucked up into the duct for discharge laterally from the silo, control means associated with said lowering means for automatically stopping the downward movement of the frame after the latter has descended within the silo a predetermined distance with the cutter rotating, and means for automatically stopping the rotation of the cutter after the latter has continued to rotate a predetermined amount following the stopping of the downward movement of the frame.

5. A silo unloader, for installation in a silo above the upper surface of the silage, comprising a vertically movable frame, means carried by the frame for loosening the silage and discharging it laterally from the silo as the frame moves downwardly, a motor for operating said means, means for controlling the downward movement of the frame and the operation of the motor, said control means including a hydraulic piston and cylinder unit for regulating the downward movement of the frame, said unit being located at the base of the silo and having one of its relatively movable parts connected with the frame, and a time switch actuated by the position of one of the relatively movable parts of said unit for shutting off the motor a predetermined length of time after the downward movement of the frame has been stopped.

6. A silo unloader, for installation in a silo above the upper surface of the silage, comprising a vertically movable frame, means for restraining the frame against free rotation, a cutter journaled in the frame at the center of the silo for rotation in a substantially horizontal plane, blades on the cutter for loosening the silage at the upper surface of the latter and working the loosened silage in toward the center of the silo, a pick-up duct leading upwardly from the cutter at the center of the silo above the point where the blades leave the loosened silage, silage conditioning means beneath the duct separate from the blades of the cutter for agitating the silage loosened by the blades to facilitate its becoming airborne, and suction means associated with the duct for causing the loosened silage to be picked up in the duct for discharge laterally from the silo.

7. A silo unloader, for installation in a silo above the upper surface of the silage, comprising a vertically movable frame, means for restraining the frame against free rotation, a cutter journaled in the frame at the center of the silo for rotation in a substantially horizontal plane, blades on the cutter for loosening the silage at the upper surface of the latter and working the loosened silage in toward the center of the silo, a pick-up duct leading upwardly from the cutter at a point adjacent the center of the silo, agitators associated with the cutter for directing the silage loosened by the blades into the duct, and suction means associated with the duct for causing the loosened silage to be picked up in the duct for discharge laterally from the silo, said blades being disposed in a horizontal plane at an angle to their direction of movement.

8. A silo unloader, for installation in a silo above the surface of the silage, comprising a vertically movable spider-like frame having a center portion and three horizontally radiating arms, which arms are adapted to engage with the sides of the silo to center the frame within the silo, three suspension cables connected to the arms, which cables are adapted to extend vertically over pulleys mounted above the same in the top of the silo and to be connected together beyond the pulleys whereby to support the frame against substantial tilting and provide in effect a single raising and lowering cable for the frame operable from a point outside the silo, said cables also acting to support the weight of the frame and to restrain the frame against rotation while allowing the frame to turn a part of a revolution, an arm journalled on a vertical axis in the center portion of the frame and extending horizontally beneath the frame for rotation in a horizontal plane, means associated with said last mentioned arm for loosening the silage and moving the loosened silage inwardly toward the center portion of the frame, means mounted on the frame for rotating said arm, and means also mounted on the frame for conducting the loosened silage to a point outside the silo, said conducting means including a portion which extends laterally between two of the suspension cables and is pivoted for horizontal movement relative to the frame.

9. Control mechanism for use in lowering an unloader in a silo, comprising a rotatable drum on which a cable leading to an unloader is adapted to be wound, a hydraulic cylinder member, a piston member therein, means for anchoring one of said members, means for connecting the other of said members to the drum in such manner as to limit to but a part of one revolution the extent to which the drum can rotate in one direction under the pull of the cable, means associated with the cylinder member for permitting fluid in that member to flow at a predetermined rate of speed from one side of the piston member to the other, whereby to permit rotation of the drum under the pull of the cable at a corresponding rate of speed, and manually adjustable means associated with said connecting means for varying the extent to which the drum is permitted to rotate.

10. Control mechanism for use in lowering an unloader in a silo, comprising a rotatable drum on which a cable leading to an unloader is adapted to be wound, a hydraulic cylinder member, a piston member therein, means for anchoring one of said members, means for connecting the other of said members to the drum in such manner as to limit to but a part of one revolution the extent to which the drum can rotate in one direction under the pull of the cable, means associated with the cylinder member for permitting fluid in that member to flow at a predetermined rate of speed from one side of the piston member to the other, whereby to permit rotation of the drum under the pull of the cable at a corresponding rate of speed, manually adjustable means associated with said connecting means for varying the extent to which the drum is permitted to rotate, and manually operable means for rotating the drum in the opposite direction, whereby to rewind the cable thereon.

11. A self contained silo unloading machine for installation as a unit in a silo above the surface of the silage therein, comprising a vertically movable support adapted to be positioned centrally of a filled or partially filled silo, cable means connected with the support for suspending and progressively lowering the same in the silo, an electric motor anchored on the support for vertical movement with the latter, a horizontally disposed silage collecting arm, which arm is pivotally connected on a vertical axis with the underside of the support in vertically fixed relation to the latter at a point adjacent the center of the silo and extends radially to a point adjacent the side of the silo, driving means for the arm operated by the motor for causing the arm to travel in a horizontal circle beneath the support about its point of connection with the latter, said arm including blade means for loosening the silage at the upper surface of the latter and moving the loosened silage in toward the pivotal axis of the arm, a rotary fan associated with the support for vertical movement with the latter, driving means for the fan operated by the motor for creating a flow of air, a relatively short suction duct at the pivotal connection of the arm with the support, which duct is open at its lower end and extends upwardly to the fan for receiving and directing into the fan the loosened silage brought in toward the pivotal axis of the arm by the operation of the blades, and a second relatively long pressure duct extending from the fan to a point outside the silo for conducting the loosened silage blown by the fan to the desired point of discharge.

12. A silo unloader, for installation in a silo above the surface of the silage, comprising a vertically movable frame, means for lowering the frame in the silo, a cutter journaled in the frame at the center of the silo for rotation relative to the frame in a substantially horizontal plane, blade means on the cutter for loosening the silage at the upper surface of the latter and for working the loosened silage in toward the center of the silo, an air duct leading upwardly from the cutter adjacent the center of the silo, and means associated with the duct for creating an upward flow of air therein of sufficient intensity to cause the loosened silage to be sucked up into the duct for discharge laterally from the silo.

13. A silo unloader according to claim 12, including control means associated with said lowering means for automatically stopping the downward movement of the frame after the latter has descended within the silo a predetermined distance with the cutter rotating.

14. A silo unloader according to claims 12 and 13, including means for automatically stopping the rotation of the cutter after the latter has continued to rotate a predetermined amount following the stopping of the downward movement of the frame.

15. A silo unloader according to claim 12, including agitators associated with the cutter and positioned immediately beneath the duct for directing the silage loosened by the blades into the duct.

16. A silo unloader according to claim 12, including means for restraining the frame against rotation.

17. A silo unloader, for installation in a silo above the upper surface of the silage, comprising a vertically movable frame, means for restraining the frame against free rotation, a cutter arm journaled in the frame at the center of the silo for rotation in a substantially horizontal plane, cutting means carried by the arm for loosening the silage at the upper surface of the latter and working the loosened silage in toward the center of the silo, a pick-up duct leading upwardly from the cutter arm at substantially the center of the silo above the point where the cutting means leaves the loosened silage, silage conditioning means beneath the duct separate from the cuting means for agitationg the silage loosened by the cutting means to facilitate its becoming airborne, and suction means associated with the duct for causing the loosened and agitated silage to be picked up in the duct for discharge laterally from the silo.

18. A silo unloader according to claim 17, wherein said silage conditioning means includes a rotary agitator which turns in a horizontal plane and is provided with a plurality of circumferentially spaced downwardly projecting silage-engaging formations.

19. A silo unloader according to claim 17, wherein said silage conditioning means includes a rotary agitator which turns in a horizontal plane and is provided with a plurality of circumferentially spaced downwardly projecting silage-engaging formations, which formations turn in a circle which is eccentric with respect to but passes through the area beneath the duct.

20. A silo unloader, for installation in a silo above the surface of the silage, comprising a vertically movable frame, means for suspending and lowering the frame in the silo, an arm journaled in the frame at substantially the center of the silo for rotation relative to the frame in a substantially horizontal plane, means for driving the arm to cause it to travel in a circle about its point of connection with the frame, cutting means carried by the arm for loosening the silage at the upper surface of the latter and working the loosened silage in toward the center of the silo, an air duct having an unobstructed vertical inlet portion mounted on the frame at substantially the center of the same and leading upwardly from the arm adjacent the center of the silo, and means mounted on the frame and associated with the duct intermediate the inlet and discharge ends of the same for creating an upward flow of air therein of sufficient intensity to cause the loosened silage to be sucked up into the duct for discharge laterally from the silo.

21. A silo unloader according to claim 20, including an extension of said arm which projects in the opposite direction from the point of connection of the arm with the frame, and means on said extension for engagement with the surface of the silage.

ELBERT C. LEACH.
OTTO F. MANTHIE.
GEORGE D. CLAPP.

REFERENCES CITED

The following references are of record in the file of this patent:

UNITED STATES PATENTS

| Number | Name | Date |
| --- | --- | --- |
| 826,646 | Blaisdell | July 24, 1906 |
| 844,693 | Seidel, Jr. | Feb. 19, 1907 |
| 846,791 | Kennedy et al. | Mar. 12, 1907 |
| 884,559 | Blaisdell | Apr. 14, 1908 |
| 967,518 | Hartmann | Aug. 16, 1910 |
| 1,007,954 | Lamb | Nov. 7, 1911 |
| 1,233,308 | Burgess | July 17, 1917 |
| 1,479,990 | Keys | Jan. 8, 1924 |
| 1,500,966 | Supinger | July 8, 1924 |
| 1,550,311 | Foster | Aug. 18, 1925 |
| 1,740,250 | Kutz, Sr. et al. | Dec. 17, 1929 |
| 1,971,425 | Morrow | Aug. 28, 1934 |
| 2,148,501 | Rasor | Feb. 28, 1939 |